UNITED STATES PATENT OFFICE 2,584,970

REDUCTION OF OXYDIVALERONITRILE

Kliem Alexander and Lester E. Schniepp, Peoria, Ill., assignors to the United States of America as represented by the Secretary of Agriculture No Drawing. Application November 19, 1948, Serial No. 61,142

3 Claims. (Cl. 260—584)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to new chemical compounds and the process for their preparation.

This invention has among its objects the provision of 4,4-dicyanodibutyl ether (oxydivaleronitrile) and the corresponding diamino compounds obtained by hydrogenation of the cyano groups. The compounds are useful as chemical intermediates for the preparation of polyesters, amides and polyamides.

Oxydivaleronitrile has the following structural formula:

$$NC(CH_2)_4O(CH_2)_4CN$$

Reduction of this compound produces diamino compounds of the following structural formula:

$$H_2N(CH_2)_5O(CH_2)_5NH_2$$

This application is a continuation-in-part of Serial No. 27,817, filed May 18, 1948, by Alexander and Schniepp.

Oxydivaleronitrile is prepared from 4,4'-dihalodibutyl ether by reaction with an inorganic water soluble cyanide, such as, for example, an alkali metal cyanide. The following specific example illustrates the procedure. It is preferable to employ a slight excess of the cyanide, and the temperature of reaction may be within the range of 100° to 250° C. Any lower aliphatic alkanol may be utilized in the place of methanol, although methanol is preferred for the sake of convenience. Small amounts of 4-alkoxy-4'-cyanodibutyl ether are produced during the reaction.

EXAMPLE I

*Preparation of 4,4'-dicyanodibutyl ether (oxydivaleronitrile)*

A mixture of 99.5 g. (0.5 mole) of 4,4'-dichlorodibutyl ether prepared as described in Serial No. 27,817, previously referred to, 58 g. (1.18 moles) of pulverized sodium cyanide and 190 cc. of anhydrous methanol was charged into a steel hydrogenation bomb, shaken, and heated to 150° C. for 6 hours. After cooling, the reaction mixture was removed from the bomb, filtered free of precipitated salt, and the methanol removed by evaporation on a steam bath. The dark colored residue was dissolved in ether, the solution filtered and the filtrate washed with water. The ether was removed by evaporation and the residue heated to 200° C. at 0.7 mm. pressure. The small amount of distillate, 8 g., was identified as 4-methoxy-4'-cyanodibutyl ethers. The undistilled material weighed 73 g., an 81 percent yield of oxydivaleronitrile. A sample of this dark colored product was purified by distillation under high vacuum and had the following properties:

B. R. 75–80° C./$10^{-4}$ mm.; $N_D^{26}$ 1.4453; $d_4^{26}$ 0.9627; $M_D$ calculated, 49.54; $M_D$ found, 49.70

Anal: Calc'd. for $C_{10}H_{16}ON_2$: C, 66.6; H, 8.95; N, 15.55. Found: C, 66.55; H, 8.82; N, 15.29

Oxydivaleronitrile may be hydrogenated according to known methods to produce the novel compound 5,5'-diaminodiamyl ether. Catalytic hydrogenation or chemical reduction methods may be employed successfully. The following example is illustrative.

EXAMPLE II

*Preparation of 5,5'-diaminodiamyl ether*

Oxydivaleronitrile, 30 g. (0.166 mole) was dissolved in 350 cc. of absolute ethanol and the solution heated to boiling. Sodium, 31 g., was added in small pieces to the boiling solution over a period of 45 minutes. Boiling was continued until all of the sodium had reacted. Most of the alcohol was then removed by distillation and the residue acidified with hydrochloric acid. The acidified mixture was evaporated to dryness and the amine hydrochloride extracted from the salt, with anhydrous ethanol. Addition of ether to the alcoholic extract precipitated the diamine dihydrochloride as a white crystalline solid. Yield 30.5 g., 70 percent of theoretical.

Anal.: Calc'd. for $C_{10}H_{24}ON_2 \cdot 2HCl$: Cl, 27.1. Found: Cl, 27.6

A portion of this dihydrochloride was mixed with an excess of 50 percent potassium hydroxide and the insoluble oil separated by extraction with ether. Evaporation of the ether left a colorless, strongly-basic liquid which absorbed carbon dioxide from the air to form a solid carbonate. The free diamine had the following properties: $N_D^{22}$, 1.4602; $d_4^{25}$, 0.907.

Anal.: Calc'd. for $C_{10}H_{22}ON_2$: N, 14.87. Found: N, 14.57

Dibenzoyl derivative: M. P. 84° C.

Anal.: Calc'd. for $C_{24}H_{32}O_3N_2$: N, 7.07. Found: N, 7.02

In the above example, the alcohol used may be any lower aliphatic alkanol. The acidification step, which results in the amine salt, may be carried out employing any strong mineral acid as for example, sulfuric, nitric, phosphoric and the like.

Having thus described the invention, what is claimed is:

1. The method of making 5,5'-diaminodiamyl ether which comprises dissolving oxydivaleronitrile in absolute ethanol and heating to boiling, adding sodium and continuing the boiling until the sodium has reacted, distilling off ethanol, acidifying the residue with hydrochloric acid, evaporating to dryness, extracting the 5,5'-diamino diamyl ether hydrochloride with anhydrous ethanol, precipitating the crystalline diamine dihydrochloride by adding ether to the ethanolic extract, mixing the diamine dihydrochloride with about 50 percent aqueous potassium hydroxide, extracting with ether, and evaporating the ether to recover the free diamine, which is 5,5'-diaminodiamyl ether.

2. The method of making 5,5'-diaminodiamyl ether comprising charging 4,4'-dichloro dibutyl ether, pulverized sodium cyanide, and anhydrous methanol into a bomb, shaking and heating to about 150° C. for a number of hours, separating precipitated salt, evaporating the methanol, thereafter the residue being dissolved in ether, the solution filtered, the filtrate washed, the ether removed, the 4-methoxy-4' cyanobutyl ether distilled off under vacuum, the undistilled material, which is oxydivaleronitrile, being dissolved in absolute ethanol, boiled with sodium, the ethanol distilled off, the residue acidified with hydrochloric acid, evaporated to dryness, extracted with anhydrous ethanol, the diamine hydrochloride precipitated with ether as a crystalline solid, the dihydrochloride then mixed with aqueous potassium hydroxide and extracted with ether, and the ether evaporated to recover free 5,5'-diaminodiamyl ether.

3. The method which comprises reducing oxydivaleronitrile by boiling with sodium and anhydrous lower alkanol, distilling off the alkanol, acidifying the residue with strong mineral acid, evaporating to dryness, extracting the amine hydrochloride with anhydrous ethanol, adding ether to the ethanolic extract to precipitate crystalline diamine dihydrochloride, mixing the latter with aqueous potassium hydroxide, extracting with ether, and evaporating the ether to recover free 5,5'-diamino diamyl ether.

KLIEM ALEXANDER.
LESTER E. SCHNIEPP.

REFERENCES CITED

The following references are of record in the file of this patent:

UNITED STATES PATENTS

| Number | Name | Date |
|---|---|---|
| 2,158,064 | Carothers | May 16, 1939 |
| 2,382,036 | Bruson | Aug. 14, 1945 |

OTHER REFERENCES

Luchmann, Berichte, vol. 29, p. 1425 (1896).
Degering, "Organic Nitrogen Compounds" (Univ. Lithoprinters, Ypsilanti, Michigan, 1945), page 204, (para. 605).